United States Patent
Gyanchandani et al.

(10) Patent No.: US 11,783,834 B1
(45) Date of Patent: *Oct. 10, 2023

(54) CONSERVING BATTERY WHILE DETECTING FOR HUMAN VOICE

(71) Applicant: Amazon Technologies, Inc., Seattle, WA (US)

(72) Inventors: Narendra Gyanchandani, Sammamish, WA (US); Bilyana Slavova, Redmond, WA (US); Njenga Kariuki, Seattle, WA (US); Matthew Heida, Snoqualmie, WA (US); Naveenan Vasudevan, Seattle, WA (US); Stephen Phillip Pant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/936,713

(22) Filed: Sep. 29, 2022

Related U.S. Application Data

(63) Continuation of application No. 16/862,359, filed on Apr. 29, 2020, now Pat. No. 11,462,218.

(51) Int. Cl.
| | |
|---|---|
| *G10L 15/22* | (2006.01) |
| *G10L 25/78* | (2013.01) |
| *G06F 1/18* | (2006.01) |
| *G06F 1/16* | (2006.01) |
| *G06F 1/3287* | (2019.01) |

(52) U.S. Cl.
CPC .............. *G10L 15/22* (2013.01); *G06F 1/163* (2013.01); *G06F 1/189* (2013.01); *G06F 1/3287* (2013.01); *G10L 25/78* (2013.01)

(58) Field of Classification Search
CPC ......... G10L 15/22; G10L 25/78; G06F 1/163; G06F 1/189; G06F 1/3287
See application file for complete search history.

(56) References Cited

U.S. PATENT DOCUMENTS

| | | | |
|---|---|---|---|
| 8,972,252 B2 | 3/2015 | Hung et al. | |
| 9,460,715 B2 * | 10/2016 | Hart | ........................ G10L 15/22 |
| 10,460,749 B1 | 10/2019 | Ru et al. | |
| 11,217,235 B1 | 1/2022 | Chu et al. | |
| 2014/0237277 A1 | 8/2014 | Mallinson et al. | |

(Continued)

OTHER PUBLICATIONS

Aguilar, G., et al., "Multimodal and Multi-view Models for Emotion Recognition," in ACL, 2019, https://www.aclweb.org/anthology/P19-1095.pdf, 12 pages.

(Continued)

*Primary Examiner* — Aurel Prifti
(74) *Attorney, Agent, or Firm* — Athorus, PLLC

(57) ABSTRACT

Described are apparatus, systems, and methods that are operable to periodically detected and record a voice of a user associated with or wearing a wearable device. As described, the wearable device apparatus is configured to transition various components of the device between a low power state and an active state to determine if audio data that includes voice is detected. If voice is not detected, the components are transitioned back to the low power state, thereby conserving power of the wearable device. If voice is detected, the audio data that includes that voice is collected for further processing.

20 Claims, 11 Drawing Sheets

(56) References Cited

U.S. PATENT DOCUMENTS

| | | | |
|---|---|---|---|
| 2014/0274203 A1* | 9/2014 | Ganong, III | G10L 15/30 455/563 |
| 2014/0278435 A1 | 9/2014 | Ganong, III et al. | |
| 2016/0183188 A1* | 6/2016 | Tsai | H04W 52/0229 370/311 |
| 2018/0342247 A1* | 11/2018 | Nicholson | H04R 3/00 |
| 2019/0005953 A1* | 1/2019 | Bundalo | G06F 1/3287 |
| 2019/0198043 A1 | 6/2019 | Crespi et al. | |
| 2021/0075902 A1 | 3/2021 | Kawamura | |
| 2021/0109585 A1 | 4/2021 | Fleming et al. | |
| 2021/0266633 A1 | 8/2021 | Zhang | |
| 2021/0327432 A1* | 10/2021 | Schwartz | G10L 21/06 |
| 2022/0180859 A1* | 6/2022 | Park | G10L 21/0272 |

OTHER PUBLICATIONS

Ba, J. L., et al., "Layer Normalization," in NIPS Deep Learning Symposium, 2016, https://arxiv.org/pdf/1607.06450.pdf, 14 pages.

Bergstra, J. and Bengio, Y., "Random Search for Hyper-Parameter Optimization," JMLR, 2012, http://jmlr.csail.mit.edu/papers/volume13/bergstra12a/bergstra12a.pdf, 25 pages.

Busso, C., et al., "IEMOCAP: Interactive Emotional Dyadic Motion Capture Database," Language Resources and Evaluation, Kluwer Academic Publishers, 2008, https://sail.usc.edu/publications/files/BussoLRE2008.pdf, 30 pages.

Devlin, J., et al., "BERT: Pre-training of Deep Bidirectional Transformers for Language Understanding," in HLT, 2019, https://www.aclweb.org/anthology/N19-1423.pdf, 16 pages.

Dhingra, B., et al., "Tweet2Vec: Character-Based Distributed Representations for Social Media," in ACL, 2016, https://www.cs.cmu.edu/~wcohen/postscript/acl-2016-bd.pdf, 6 pages.

Braves, A., et al., "Connectionist Temporal Classification: Labelling Unsegmented Sequence Data with Recurrent Neural Networks," in ICML, 2006, https://www.cs.toronto.edu/~graves/icml_2006.pdf, 8 pages.

Greedy Decoder, https://www.tensorflow.org/api_docs/python/tf/nn/ctc_greedy_decoder, (downloaded Jun. 14, 2017, by web.archive.org).

He, K., et al., "Deep Residual Learning for Image Recognition," in CVPR, 2016, http://openaccess.thecvf.com/content_cvpr_2016/papers/He_Deep_Residual_Learning_CVPR_2016_paper.pdf, 9 pages.

Hochreiter, S. and Schmidhuber, J., "Long Short-Term Memory," Neural Computation, vol. 9, No. 8, pp. 1735-1780, 1997, https://www.researchgate.net/profile/Sepp_Hochreiter/publication/13853244_Long_Short-term_Memory/links/5700e75608aea6b7746a0624/Long-Short-term-Memory.pdf?origin=publication_detail, 33 pages.

Lakomkin, E., et al., "Incorporating End-To-End Speech Recognition Models For Sentiment Analysis," in ICRA, 2019, https://arxiv.org/pdf/1902.11245.pdf, 7 pages.

Lin, L. I-K., "A Concordance Correlation Coefficient to Evaluate Reproducibility," Biometrics, 1989, https://pdfs.semanticscholar.org/1527/ba83e2656b0427052b5209c0470affa318ef.pdf?_ga=2.221014936.1226002713.1582334499-1985355348.1527123823, 14 pages.

Liu, Z., et al., "Entity Recognition from Clinical Texts via Recurrent Neural Network," BMC Medical Informatics and Decision Making, 2017, https://bmcmedinformdecismak.biomedcentral.com/track/pdf/10.1186/s12911-017-0468-7, 9 pages.

Lotfian, R. and Busso, C., "Building Naturalistic Emotionally Balanced Speech Corpus by Retrieving Emotional Speech from Existing Podcast Recordings," IEEE Transactions on Affective Computing, 2017, 13 pages.

Lu, Z. et al., Speech Sentiment Analysis via Pre-Trained Features from End-to-End ASR Models, Computation and Language (cs.CL); Machine Learning (cs.LG); Audio and Speech Processing (eess.AS), 5 pages, https://arxiv.org/pdf/1911.09762.pdf.

Metze, F., et al., "Emotion Recognition using Imperfect Speech Recognition," in Interspeech, 2010, http://www.cs.cmu.edu/~fmetze/interACT/Publications_files/publications/emo-asr_is.pdf, 4 pages.

Miao, Y., et al., "EESEN: End-To-End Speech Recognition Using Deep Rnn Models and WFST-Based Decoding," in ASRU, 2015, http://www.cs.cmu.edu/~fmetze/interACT/Publications_files/publications/eesenasru.pdf, 8 pages.

Neto, J., et al., "Speaker-Adaptation for Hybrid Hmm-Ann Continuous Speech Recognition System," in Eurospeech, 1995, https://www.researchgate.net/profile/Ciro_Martins/publication/2421983_Speaker-Adaptation_For_Hybrid_Hmm-Ann_Continuous_Speech_Recognition_System/links/0c9605186c6a9dcde0000000/Speaker-Adaptation-For-Hybrid-Hmm-Ann-Continuous-Speech-Recognition-System.pdf?origin=publication_detail, 5 pages.

Pandit, V. and Schuller, B., "On Many-To-Many Mapping Between Concordance Correlation Coefficient snd Mean Square Error," arXiv:1902.05180, 2019, https://arxiv.org/pdf/1902.05180.pdf.

Preoţiuc-Pietro, D., et al., "Modelling Valence and Arousal in Facebook Posts," in WASSA, 2016, http://wwbp.org/papers/va16wassa.pdf, 7 pages.

Radford, A., "Learning to Generate Reviews and Discovering Sentiment," arXiv:1704.01444, 2017, https://arxiv.org/pdf/1704.01444.pdf, 9 pages.

Rozgić, V., et al., "Emotion Recognition Using Acoustic and Lexical Features," in Interspeech, 2012, https://pdfs.semanticscholar.org/5259/39fff6c81b18a8fab3e502d61c6b909a8a95.pdf?_ga=2.28666044.1226002713.1582334499-1985355348.1527123823, 4 pages.

Rozgic, V., et al., "Multi-Modal Prediction of PTSD and Stress Indicators," in ICASSP, 2014, 5 pages.

Schuller, B., et al., "Emotion Recognition from Speech: Putting ASR in the Loop," in ICASSP, 2009, https://www.researchgate.net/profile/Anton_Batliner/publication/224929707_Emotion_Recognition_from_Speech_Putting_ASR_in_the_Loop/links/0fcfd50f6bb1a766a1000000/Emotion-Recognition-from-Speech-Putting-ASR-in-the-Loop.pdf?origin=publication_detail, 5 pages.

Schuller, B.W., "Speech Emotion Recognition," Communications of the ACM, vol. 61, No. 5, pp. 90-99, 2018, 10 pages.

Seyeditabari, A., et al., "Emotion Detection in Text: A Review," arXiv:1806.00674, 2018, https://arxiv.org/pdf/1806.00674.pdf, 14 pages.

Stuhlsatz, A., et al., "Deep Neural Networks for Acoustic Emotion Recognition: Raising the Benchmarks," in ICASSP, 2011, https://mediatum.ub.turn.de/doc/1107313/file.pdf, 4 pages.

Xiao, Y. and Cho, K., "Efficient Character-Level Document Classification By Combining Convolution and Recurrent Layers," arXiv:1602.00367, 2016, https://arxiv.org/pdf/1602.00367.pdf, 10 pages.

Yao, K., et al., "Adaptation of Context-Dependent Deep Neural Networks for Automatic Speech Recognition," in SLT, 2012, https://www.microsoft.com/en-us/research/wp-content/uploads/2016/02/0000366.pdf, 4 pages.

Yoon, S., et al., "Multimodal Speech Emotion Recognition Using Audio and Text," in SLT, 2018, https://arxiv.org/pdf/1810.04635.pdf, 7 pages.

Zhang, B., et al., "Exploiting Acoustic and Lexical Properties of Phonemes to Recognize Valence from Speech," in ICASSP, 2019, http://web.eecs.umich.edu/~emilykmp/EmilyPapers/2019_Zhang_ICASSP.pdf, 5 pages.

Zhang, X., et al., "Character-level Convolutional Networks for Text Classification," in NIPS, 2015, http://papers.nips.cc/paper/5782-character-level-convolutional-networks-for-text-classification.pdf, 9 pages.

* cited by examiner

CONSERVING BATTERY WHILE DETECTING FOR HUMAN VOICE

PRIORITY CLAIM

This application is a Continuation of U.S. patent application Ser. No. 16/862,359, filed Apr. 29, 2020, and titled "Conserving Battery While Detecting For Human Voice," the contents of which are herein incorporated by reference in their entirety.

BACKGROUND

Wearable devices are increasing in popularity. Many of the current devices include sensors that are operable to measure a variety of metrics about the user wearing the device. Metrics include heart rate, blood pressure, motion, step count, sleep quality, etc. Many current systems simply report the collected metrics to the user, for example, over a period of time. Each of these devices utilize a battery to power the components within the devices that collected the various items of information.

BRIEF DESCRIPTION OF DRAWINGS

The detailed description is described with reference to the accompanying figures.

DETAILED DESCRIPTION

Figure 1:
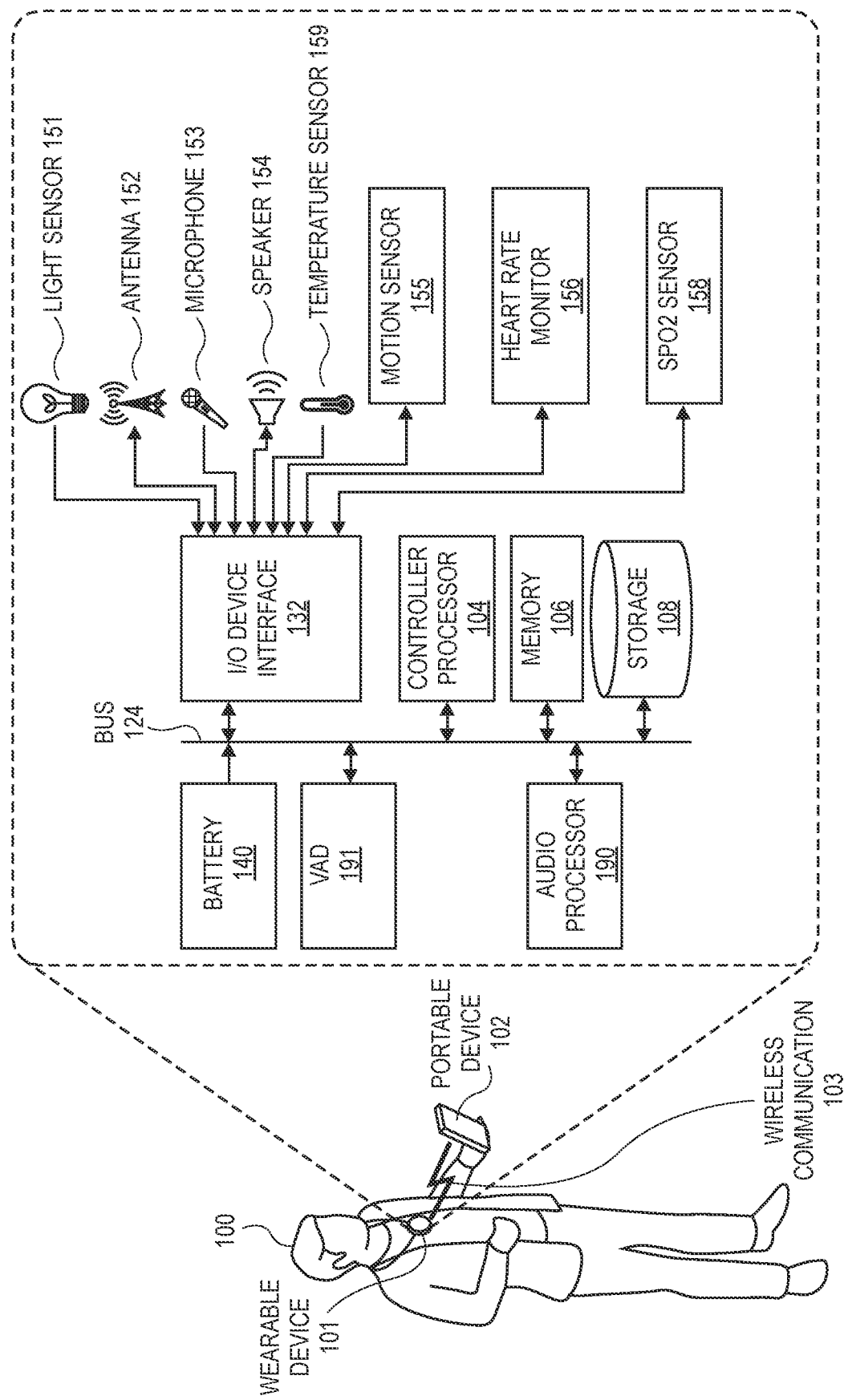
FIG. 1 is an example diagram of a wearable device apparatus and a portable device of a user, in accordance with described implementations.

Described is a wearable device apparatus that is operable to periodically detected and record a voice of a user associated with or wearing the wearable device. In accordance with described implementations, the wearable device apparatus is configured to transition various components of the device between a low power state and an active state to determine if audio data that includes voice is detected. If voice is not detected, the components are transitioned back to the low power state, thereby conserving battery charge of the battery (or conserve the power supply of a power source of the wearable device apparatus). As used herein, when a component is in a low power state, the power consumed by that device is reduced or eliminated compared to when the device is in the active state and operating.

If, however, voice is detected in the audio data, collection of the audio data continues. As the audio data is collected, it is processed in real-time or near real-time to determine if voice data is still included in the audio data. If voice data is included in the audio data, collection will continue, up to a defined collection time duration, and the audio data stored in a memory of the wearable device as a voice data segment representative of a voice of a user associated with the wearable device. If it is determined during collection and prior to satisfaction of the defined collection time duration that voice data is no longer detected in the collected audio data, collection is terminated, the collected audio data that does include voice data is stored in memory of the wearable device, and the components of the wearable device are transitioned back to the low power state.

This process of transitioning from a low power state to an active state, checking for voice data in audio data and either transitioning back to the low power state if voice data is not detected or continuing to collect the audio data if voice data is detected may continue in accordance with a monitoring schedule that is followed by the wearable device and/or until a defined amount of audio data has been collected for the user during a collection cycle, referred to herein as a maximum voice data amount.

Collected audio data may be further processed by the wearable device and/or wirelessly transmitted from the wearable device to a portable device (e.g., cell phone, tablet, laptop) of the user associated with the wearable device and further processed by the portable device. Processing may include, but is not limited to, processing of the voice data to determine if the voice corresponds to the user associated with the wearable device, processing of the voice data to determine an emotion or intent, processing of the voice data to determine an action, processing of the voice data to determine one or more aspects corresponding to the voice, etc. For example, if the voice data is processed and determined to not correspond with the user associated with the wearable device, the voice data may be discarded and removed from memory without further processing.

It is worth noting that in the disclosed implementations, the collected audio data and/or voice data is not transmitted from the wearable device apparatus or the portable device to any remote computing systems and all processing of the audio data and/or the voice data discussed herein may be performed on the wearable device apparatus alone, on the portable device alone, or on a combination of the wearable device apparatus and the portable device.

As discussed further below, the disclosed implementations provide a technical improvement to battery/power conservation and operability of an apparatus to collect meaningful voice data from a user associated with the apparatus. In some implementations, a wearable device, such as the wearable device apparatus discussed below with respect to FIG. 1, utilizing the disclosed implementations, may operate on a single battery charge for two or more days while at the same time collecting and storing voice data representative of voice generated from the user associated with the wearable device. In comparison, without use of the disclosed implementations, the same device operating to collect and store voice data representative of voice generated from the user associated with the wearable device would only be able to operate on a single battery charge for less than ten hours.

FIG. 1 is an example diagram of a wearable device apparatus 101 and a portable device 102 of a user 100, in accordance with described implementations.

The portable device 102 may be any type of portable device, including, but not limited to, a cellular phone (aka smart phone), tablet, touch-pad, laptop, etc. As discussed further below with respect to FIGS. 11-12, the portable device may include a display, such as a touch-based display and a wireless communication interface, such as 802.15.4 (ZIGBEE), 802.11 ("WI-FI"), 802.16 ("WiMAX"), BLUETOOTH, Z-WAVE, Near Field Communication ("NFC"), etc. to enable wireless communication 103 with the wearable device 101.

The wearable device apparatus 101 may be any form of wearable device. For example, the wearable device apparatus may be in the form of a wristband, a necklace (as illustrated in FIG. 1), headphones, a ring, a watch, an earring, a headband, glasses, an article of clothing, an on-skin apparatus (e.g., an adhesive patch), etc.

In operation, the wearable device 101 may include a battery 140 and/or other power source, computer-readable and computer-executable instructions, one or more controllers/processors 190 that may include a central processing unit (CPU) for processing data and computer-readable instructions, and a memory 106 for storing data and instructions of the wearable device apparatus. The memory 106 may individually include volatile random access memory (RAM), non-volatile read only memory (ROM), non-volatile magnetoresistive (MRAM) and/or other types of memory. The wearable device 101 may also include a data storage component 108 for storing data, controller/processor-executable instructions, audio data, experiment data, monitoring schedules, etc. Each data storage component may individually include one or more non-volatile storage types such as magnetic storage, optical storage, solid-state storage, etc.

Computer instructions for operating the wearable device 101 and its various components may be executed by the controller(s)/processor(s) 104, using the memory 106 as temporary "working" storage at runtime. A wearable device's 101 computer instructions may be stored in a non-transitory manner in non-volatile memory 106, storage 108, or an external device(s). Alternatively, some or all of the executable instructions may be embedded in hardware or firmware on the wearable device 101 in addition to or instead of software.

The wearable device 101 also includes an input/output device interface 132. A variety of components may be connected through the input/output device interface 132. Additionally, the wearable device 101 may include an address/data bus 124 for conveying data among components of the wearable device. Each component within the wearable device 101 may also be directly connected to other components in addition to (or instead of) being connected to other components across the bus 124.

The wearable device 101 may be "headless" and may primarily rely on spoken commands for input and/or through interaction with one or more control interfaces or buttons. In other examples, the wearable device 101 may include a display, which may allow a touch-based interface. The wearable device 101 may also include input/output device interfaces 132 that connect to a variety of components such as an audio output component, such as a speaker 154. The device 102 also includes an audio capture component. The audio capture component may be, for example, a microphone 153 or array of microphones, etc. The microphone 153 may be configured to capture audio, such as environmental noises, voices, etc., and generate audio data The wearable device 101 may also include other sensors that collect sensor data, that may be representative of user data. Any number and/or type of sensors may be included in the device. In the illustrated example, in addition to the microphone, the wearable device 101 may include a light sensor 151 that may measure the ambient light, one or more temperature sensors 159 that may measure the ambient temperature and/or measure the temperature of the user when wearing the wearable device, a motion sensor 155, such as an accelerometer, gyroscope, etc., to measure movement of the user, a heart rate monitor 156 to measure the heart rate of the user, an SpO2 sensor 158 to measure the saturation percentage of oxygen in the blood, and/or other sensors/monitors to measure other user data and/or environment data.

The wireless device 101 may also include a communication interface, such as an antenna 152 to enable wireless communication 103 between the wearable device 101 and the portable device 102. Any form of wireless communication may be utilized to facilitate communication between the wearable device 101 and the portable device 102, and/or other device local to the user and/or associated with the user. For example, any one or more of ZIGBEE, WI-FI, WiMAX, BLUETOOTH, Z-WAVE, NFC, etc., may be used to communicate between the wireless device 101 and the portable device 102, etc. For example, the wearable device 101 may be configured to transmit audio data and/or features extracted from collected audio data that is collected by the microphone 153 of the wearable device 101.

The wearable device 101 may also include a voice activity detector ("VAD") 191 that is configured to process received audio data in real-time or near real-time as it is generated by the microphone and determine if voice data, such as voice data representative of human voice, is included in the audio data. For example, the VAD 191 may be configured to process the audio data, using one or more signal processing algorithms, for characteristics of signals present in the audio data (e.g., frequency, energy, zero-crossing rate, etc.) that are likely to be human speech. In some implementations, the wearable device may also include an audio processor 190 that is configured to process collected audio data to determine if voice data included in the collected audio data corresponds to a voice of the user 100 associated with or wearing the wearable device 101. For example, the audio processor 190 may be a digital signal process ("DSP") that is tuned to process signals, such as audio data, for frequencies that correspond with a vocal pattern (e.g., vocal tones and frequencies) of the user 100. In other implementations, processing of the audio data may be completed on the portable device 102.

As discussed further below, if collected audio data that includes voice data is processed and determined to not correspond with the user associated with or wearing the wearable device 101, the audio data may be discarded and removed from memory without further processing. Likewise, even audio data that does include voice data of the user 100 may be discarded once processing of the voice data portion of the audio data is complete. In some implementations the audio processor 190 may be in the form of machine learning network, neural network, deep learning network, etc. For example, the audio processor 190 may include a long short-term memory ("LSTM"), which is an artificial recurrent neural network architecture, that is trained to process voice data collected by the wearable device apparatus 101.

Each of the components of the wearable device 101 may be powered by the power supply of the wearable device, such as the battery 140. With the disclosed implementations, one or more of the components of the wearable device 101 may transition between a low power state, during which the component consumes little if any power from the power source (e.g., battery), and an active state where the component is operational. Transitioning components of the wearable device 101 between the low power state and the active state, conserves power and extends the operability of the wearable device 101 before the power supply of the wearable device must be recharged.

Figure 2:
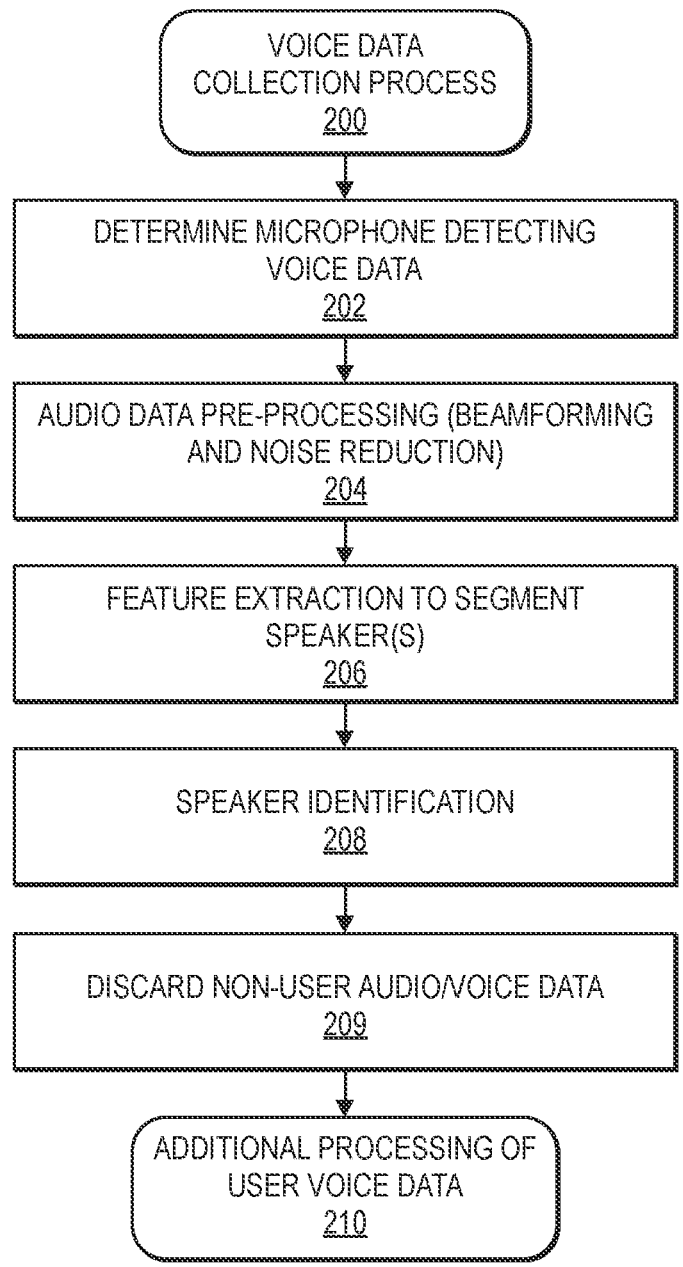
FIG. 2 is an example high-level voice data collection process, in accordance with described implementations.

FIG. 2 is an example high-level voice data collection process 200, in accordance with described implementations.

The example voice data collection process 200 is a high level overview of the collection and processing of audio data in accordance with the disclosed implementations. Following FIG. 2 are various implementations described with respect to FIGS. 3 through 9 that may be used alone or in combination to conserve power of the wearable device and still achieve the example process 200 of collecting and processing voice data of a user associated with the wearable device.

The example process 200 begins upon a determination that the microphone of the wearable device is detecting voice data in generated audio data, as in 202. The detection of voice data included in generated audio data occurs when the microphone of the wearable device is transitioned from the low power state to the active state and is generating audio data representative of the audio within the environment surrounding the wearable device. The generated audio data is processed by the VAD of the wearable device to determine if the audio data includes voice data representative of a human voice.

Upon determining that voice data is detected in the generated audio data, collection of the audio data continues, and audio data pre-processing occurs, as in 204. Audio data pre-processing may include but is not limited to beamforming of the microphone to focus the audio data collection in a direction of a source of the voice data. For example, if the wearable device includes an array of microphones, the time-difference-of-arrival ("TDoA") of the voice data at each microphone of the microphone array may be used to determine a direction toward the source of the voice data. Likewise, in some implementations, noise reduction, through use of filters or other pre-processing techniques may be performed on the received audio data to eliminate or reduce background noises, that are included in the audio data with the voice data.

Feature extraction may also be performed on the audio data to segment the audio data between different speakers (i.e., different voices) included in the audio data, as in 206. For example, the audio data may be processed to determine spectral features corresponding to each voice detected in the audio data and different sets of spectral features segmented into different voice data segments.

As the audio data is segmented into the different speakers, the segments of audio may be further processed to determine if the voice represented in each voice data segment corresponding to a voice of the user associated with or wearing the wearable device, as in 208. For example, a DSP or LSTM network may be used to further process the voice data segments and compare those voice data segments with a known vocal pattern (e.g., vocal tones and frequencies) of the voice of the user associated with the wearable device. Based at least in part on the comparison, it may be determined if the voice included in the voice data segment corresponds with the user associated with the wearable device or does not correspond with the user associated with the wearable device. As discussed herein, if it is determined that the voice does not correspond to the user associated with the wearable device, the voice data segment is discarded and removed from memory without further processing, as in 209. For voice data segments that are determined to include voice data of the user associated with the wearable device, additional processing of that voice data may be performed, as in 210. Additional processing of a user's voice data may take any of a variety of forms from processing the voice data to determine a sentiment, an action or command, emotion, etc.

Figure 3:
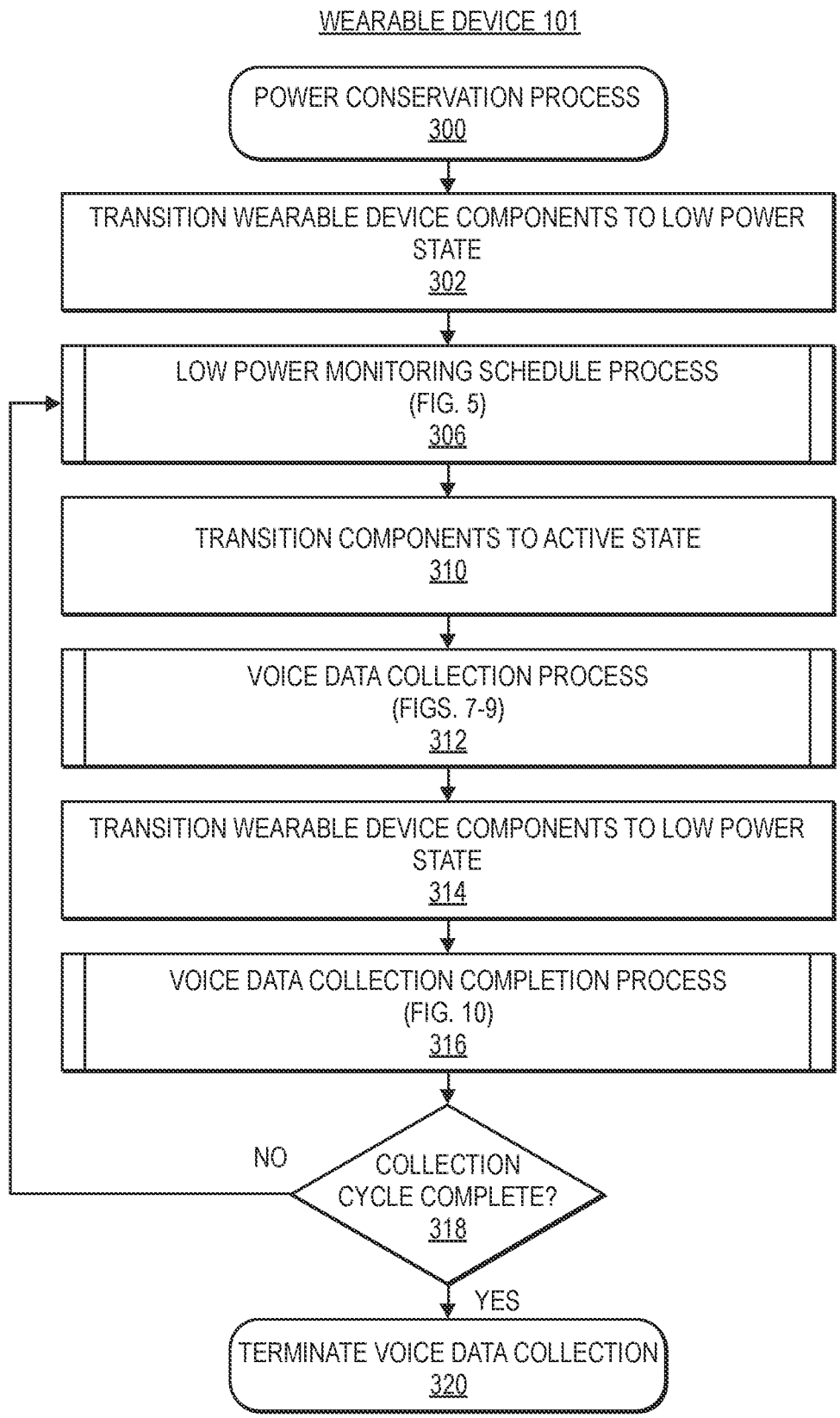
FIG. 3 is an example power conservation process, in accordance with described implementations.

FIG. 3 is an example power conservation process 300, in accordance with described implementations. The power conservation process 300 may be performed to reduce the amount of power consumed by one or more computing resources when collecting, by the wearable device, voice data of a user associated with the wearable device.

Figure 9:
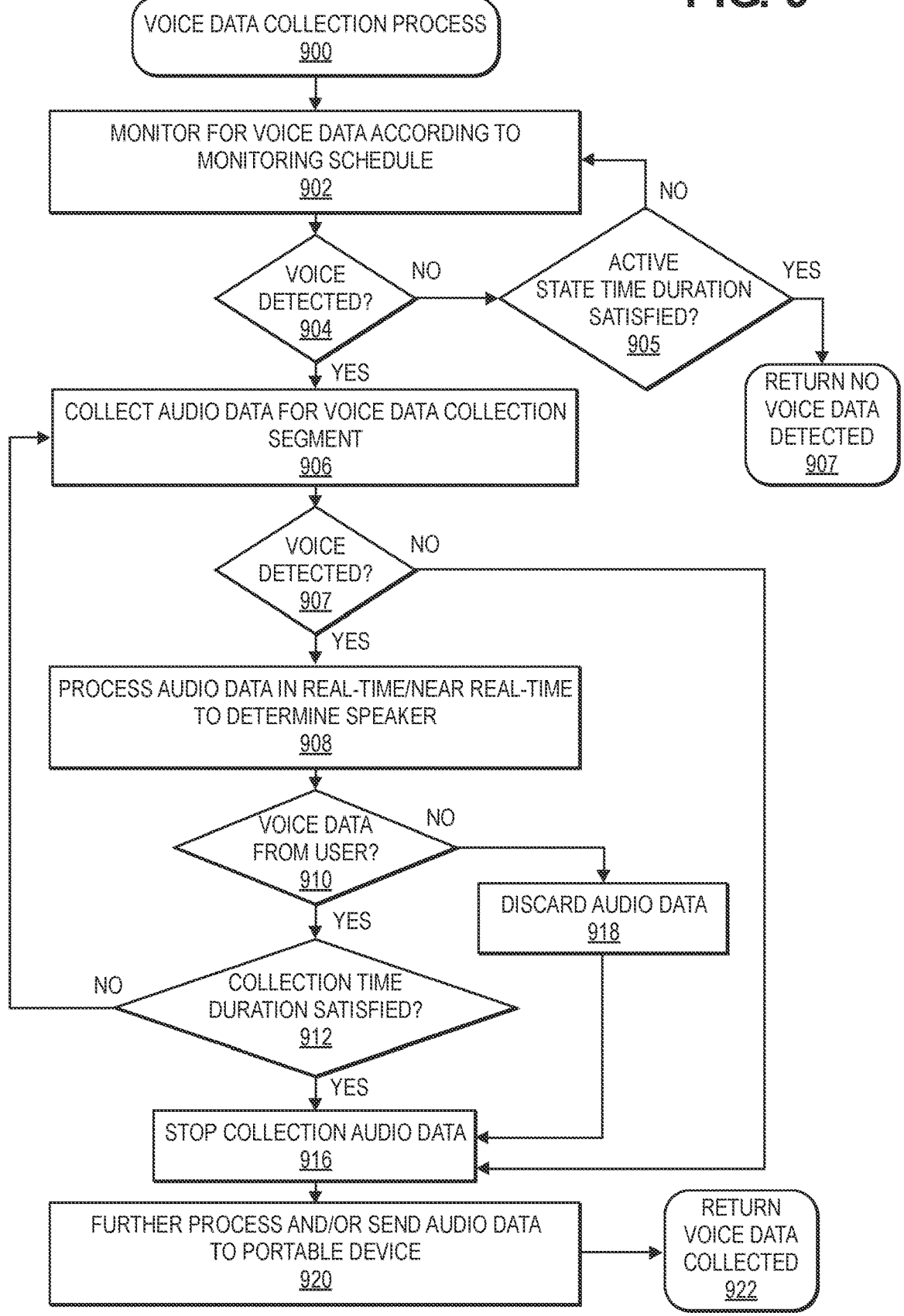
FIG. 9 is another example voice data collection process, in accordance with described implementations.
Figure 10:
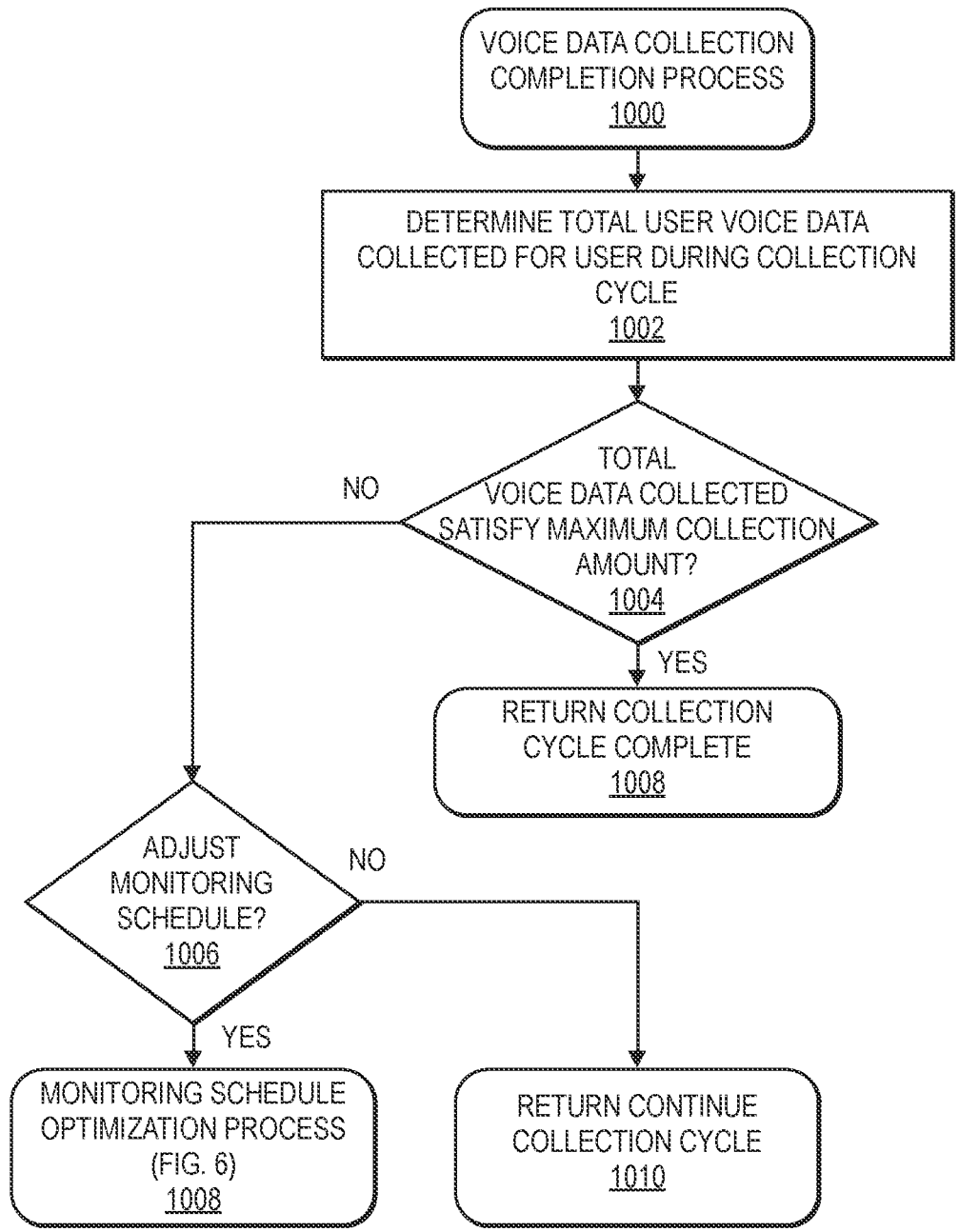
FIG. 10 is an example voice data collection completion process, in accordance with described implementations.

As discussed, the example process 300 may be performed by the wearable device 101 and in conjunction with one or more of the sleep cycle process 400 (FIG. 4), the example low power monitoring schedule process 500 and/or the example monitoring schedule optimization process 600 (FIGS. 5-6), one or more of the voice data collection processes 700-900 (FIGS. 7-9), and/or the example voice data collection completion process 1000 (FIG. 10).

For example, the sleep cycle process 400 (FIG. 4) may be performed concurrent with the other example processes discussed herein and, upon detection of a sleep cycle and/or non-use of the wearable device, may suspend processes of the wearable device until the sleep cycle is complete and/or the device becomes active.

The example process 300 begins by transitioning one or more components of the wearable device 101 to a low power state, as in 302. In some implementations, all components of the wearable device may be transitioned to the low power state. In other implementations, for example, if the wearable device has components that perform functions other than those related to voice data collection, the example process may only transition to the low power state those components that are used for voice data collection. For example, in some implementations, the example process may transition at least the VAD and microphone of the wearable device 101 to the low power state.

While the components are in the low power state, the low power monitoring schedule process (FIG. 5) is performed, as in 306. As discussed further below with respect to FIG. 5, the monitoring schedule may be a static or dynamic schedule that specifies the time duration during which the components of the wearable device are to be maintained in the low power state and when, and for how long, components (e.g., microphone and VAD) are to be transitioned to the active state to monitor for voice data. As discussed further below, the example low power monitoring schedule process 500 may continue until the example low power monitoring schedule process 500 determines that the wearable device is to monitor for voice data. Upon determination by the example low power monitoring schedule process 500 that the wearable device is to monitor for voice data, the example low power monitoring schedule process 500 sends to the example power conservation process 300 an indication to transition one or more components to the active state and to monitor for voice data for a defined monitoring time duration.

Upon receiving an indication from the example low power monitoring schedule process 500, the example process transitions one or more components of the wearable device to the active state so that those components can monitor for voice data, as in 310. For example, in some implementations, the example process 300 may only transition the VAD from the low power state to the active state as the VAD may be the only component necessary to monitor for voice data. In such an example, the microphone may be operable to collect data while operating in a low power state or the microphone may remain in the active state. In other implementations, the disclosed implementations may only transition the microphone, the VAD, and optionally other components, from the low power state to the active state to monitor for voice data. Likewise, as discussed further below, in some implementations, in response to detection of voice, other components may be transitioned from the low power state to the active state for further collection and/or processing of the voice data.

Upon transitioning one or more of the components of the wearable device from the low power state to the active state to enable monitoring for voice data, one or more of the example voice data collection processes are performed, as in 312. Example voice data collection processes are discussed further below with respect to FIGS. 7-9. As discussed further below, each of the example voice data collection processes monitor for voice data and either determine that voice data is not detected in the environment surrounding the wearable device, or determine that voice data is detected in the environment surrounding the wearable device. Still further, if an example voice data collection process determines that no voice data is detected, the example voice data collection process returns to the power conservation process 300 an indication that no voice data was detected. In comparison, if the example voice data collection process determines that voice data is detected, the example voice data collection process collects the voice data. Upon completion of voice data collection, the example voice data collection process returns an indication to the example power conservation process 300 that voice data was collected.

When an example voice data collection process returns either an indication that voice data was not detected or an indication that voice data was collected, the example process 300 transitions the components of the wearable device back to the low power state to conserve power of the power source of the wearable device, as in 314. In addition, in some implementations, the example voice data collection completion process (FIG. 10) may be performed, as in 316. As discussed further below, in some implementations, only a defined amount of voice data is to be collected during a collection cycle (e.g., one day, one week, etc.). The example voice data collection completion process discussed below with respect to FIG. 10 determines if a sufficient amount of voice data has been collected during the collection cycle for the user associated with the wearable device. If the example voice data collection completion process determines that a sufficient amount of data has been collected during the collection cycle, the example voice data collection completion process returns an indication that the collection cycle is complete. In comparison, if the example voice data collection completion process determines that the collection cycle is not complete, the example voice data collection completion process returns an indication to continue voice data collection.

In implementations in which the example voice data collection completion process is performed, based on the response from the example voice data completion process, the example power conservation process 300 determines if the collection cycle is complete, as in 318. If it is determined that the collection cycle is complete, the example process 300 completes by terminating the voice data collection for the remainder of the collection cycle, as in 320. If it is determined that the collection cycle is not complete, the example process returns to a low power monitoring schedule process (block 306) and continues. If the example process 300 does not implement the voice data collection completion process (block 316) the example process 300 returns to the low power monitoring schedule process (block 306), without determining if the collection cycle is complete.

Figure 4:
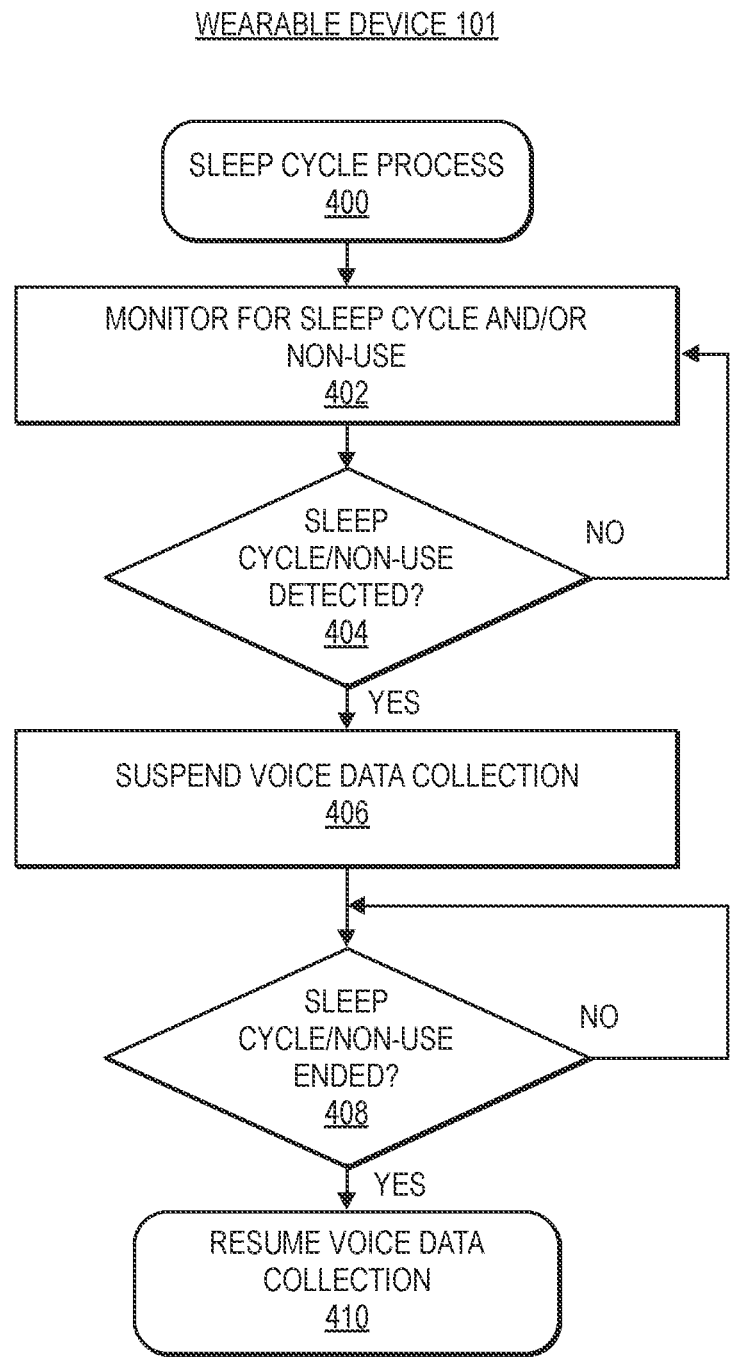
FIG. 4 is an example sleep cycle process, in accordance with described implementations.

FIG. 4 is an example sleep cycle process 400, in accordance with described implementations. The example sleep cycle process 400 may be performed by the wearable device 101 concurrent with one or more other processes discussed herein.

The example process 400 begins by monitoring for a sleep cycle of the user associated with the wearable device 101 and/or a non-use of the wearable device, as in 402. For example, a user associated with the wearable device may provide a sleep cycle time duration or schedule (e.g., 22:00 hours to 07:00 hours). In other implementations, one or more sensors of the wearable device may monitor for various signals from the user that are indicative of the user sleeping (e.g., movement, heartrate, body temperature, blood pressure, SpO2, etc.). Likewise, non-use may be determined based on a lack of movement of the wearable device and/or non-detection of the user by various sensors of the wearable device (e.g., heartrate monitor sensor, temperature sensor, etc.).

As the example process monitors for a sleep cycle of the user and/or non-use of the wearable device, a determination is made as to whether a sleep cycle or non-use is detected, as in 404. If it is determined that a sleep cycle or non-use of the wearable device is detected, the voice data collection process is suspended, as in 406. In some implementations, other processes of the wearable device 101 may also be suspended.

Upon suspension of the voice data collection process, and optionally other processes, the example process 400 may continue to monitor for and determine if the sleep cycle/ non-use has been ended, as in 408. If it is determined that the sleep cycle or non-use has not ended, the example process 400 remains at decision block 408 and continues monitoring. If it is determined that the sleep cycle and/or non-use has ended, the example process allows the voice data collection process and any other suspended processes to resume, as in 410.

By suspending the voice data collection process, and optionally other processes of the wearable device, power consumption by those processes is reduced or eliminated during the sleep cycle or non-use of the wearable device, thereby extending the operability of the wearable device before the power source (e.g., battery) of the wearable device must be recharged.

Figure 5:
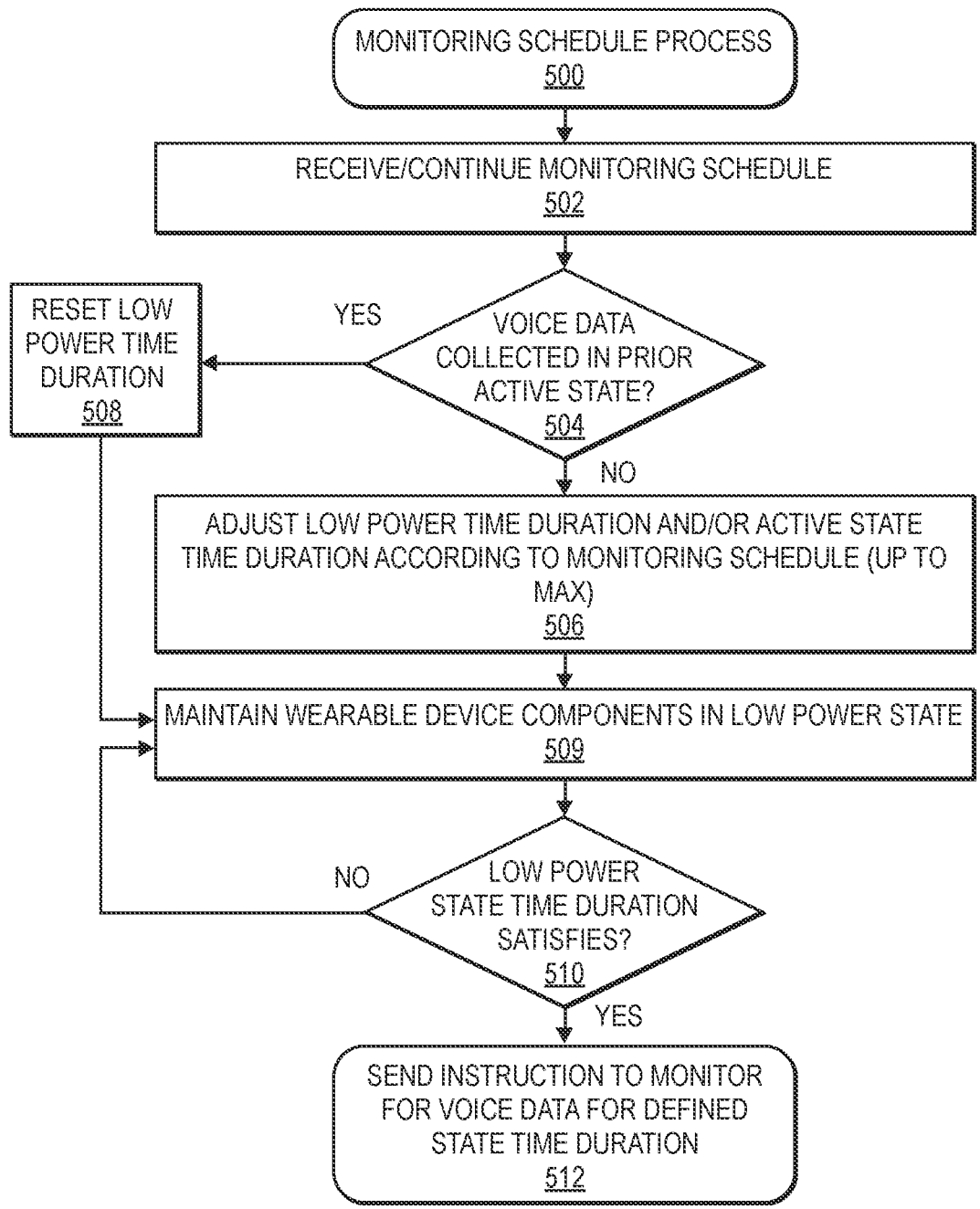
FIG. 5 is an example monitoring schedule process, in accordance with described implementations.

FIG. 5 is an example low power monitoring schedule process 500, in accordance with described implementations. The example process 500 may be performed on the wearable device 101.

The example process 500 begins with receipt or continuation of a monitoring schedule, as in 502. A monitoring schedule may be provided to the wearable device 101, for example, from a portable device 102 associated with the user 100. In other implementations, the monitoring schedule may be maintained in a memory of the wearable device 101.

A monitoring schedule may include, for example, a collection cycle start time, a collection cycle end time, an amount of voice data of the user to be collected during the collection cycle, and a schedule or frequency for transitioning wearable device components from the low power state to the high power state to monitor for voice data of the user, referred to herein as a "low power state/active state cycle." For example, in some implementations, a static monitoring schedule may specify a collection cycle start time of 00:00, a collection cycle end time of 24:59, and a low power state/active state cycle of two minutes (low power state) and one minute (active state)—a two-minute/one-minute cycle.

In other implementations, the low power state/active state cycle may be dynamic and adjust based on whether voice data was detected during a previous active state. For example, the low power state/active state cycle may be configured to start with a one-minute/one-minute cycle and if it is determined that voice data was detected during the prior active state, remain at the one-minute/one-minute cycle. However, if it is determined that no voice data of the user was detected during the prior active state the low power state time duration may be increased to a two-minute cycle, then a five-minute cycle, then a fifteen minute cycle, etc., up to a defined maximum low power state time duration (e.g., sixty-minutes). In such an example, the active state time duration may remain at one-minute. In other examples, the active state time duration may be adjusted to be longer or shorter. In such an example, if voice data is detected during an active state, the low power state/active state cycle times may reset to the initial cycle times (e.g., one-minute/one-minute).

In still other examples, the low power state time duration and/or active state time duration indicated in the monitoring schedule may vary depending on one or more of the time of day, user historical behavior, calendar information of the user, user provided preferences, amount of time remaining in a collection cycle, the amount of voice data collected during the collection cycle, etc. For example, a user may indicate that the wearable device is to monitor for voice data of the user more frequently in the morning (e.g., 06:00-10:00), during lunch (12:00-13:00), and during dinner (18:00-19:00). As another example, if calendar data of a calendar associated with the user indicates that the user will be in a meeting from 10:00-11:00 and again from 13:00-14:00, the monitoring schedule may specify that the low power state/active state cycle times during the meetings is to be more frequent (e.g., one-minute/one-minute) than when not in meetings (e.g., five-minutes/one-minute. Likewise, in some implementations, the monitoring schedule may be a blend of both of the above examples. For example, the monitoring schedule may specify that the low power state time duration increases when no voice detection occurs but that during periods when it is expected that voice data detection is more likely (e.g., during a meeting), the monitoring schedule may specify more frequent low power state/active state cycle times that may or may not adjust based on whether voice data is detected.

Returning to FIG. 5, for implementations in which the low power state time duration and/or the active state time durations are adjusted based on whether voice data was detected during a prior active state, a determination is made as to whether voice data was detected during the prior active state, as in 504. If it is determined that voice data was not detected in during the prior active state, the low power time duration and/or active state time duration are adjusted according to the monitoring schedule, up to a maximum low power state time duration and a minimum or maximum active state time duration, as in 506. If it is determined that voice data was detected during the prior active state, the lower power time duration and/or the active state time duration are reset to initial values, as in 508.

In implementations in which the low power state time duration and/or active state time duration are not adjusted, the example process may proceed directly to block 509. At block 509, the example process maintains the wearable device components in the low power state until the low power time duration is satisfied.

While the wearable device components are in the low power state, a determination is made as to whether the low power time duration is satisfied, as in 510. If it is determined that the low power state time duration has not been satisfied, the example process 500 returns to block 509 and continues. However, upon determination that the low power state time duration has been satisfied, the example process 500 sends an instruction to the example power conservation process 300 (FIG. 3) to monitor for voice data for an active state time duration, as in 512.

In some implementations, the monitoring schedule may be optimized based on a variety of factors to adjust the low power state/active state cycle times and/or when those cycles occur.

Figure 6:
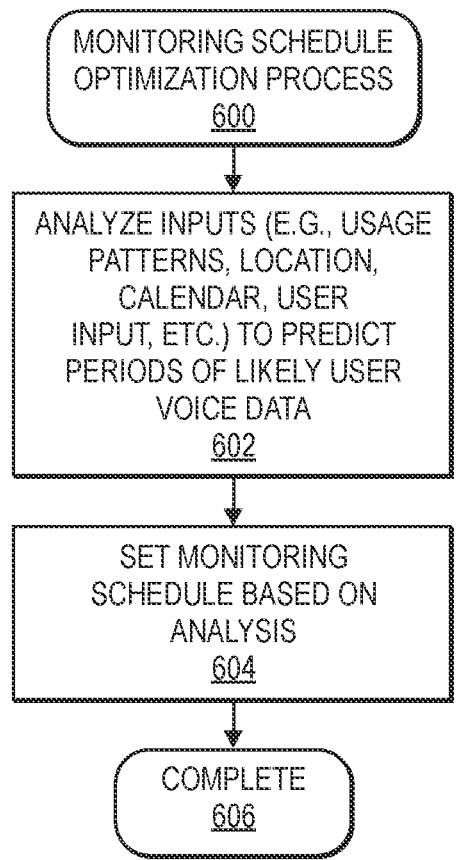
FIG. 6 is an example monitoring schedule optimization process, in accordance with described implementations.

FIG. 6 is an example monitoring schedule optimization process 600, in accordance with described implementations. The example process may be performed on the wearable device 101, on the portable device 102 associated with the user and then the monitoring schedule provided to the wearable device by the portable device, on one or more remote computing systems and provided from the remote computing systems to the portable device and/or the wearable device, and/or any combination thereof. In this example, the monitoring schedule optimization process may be performed by one or more remote computing resources as there is no need for any of the actual audio data and/or voice data to complete the example process 600.

The example process 600 begins by analyzing various inputs that may be used to adjust and optimize the monitoring schedule, as in 602. The various inputs include, but are not limited to, user usage patterns, current or predicted locations of the user/wearable device, calendar entries of the calendar of the user, predicted periods of likely user voice data collection, the remaining time in a collection cycle, amount of data collected in prior collection cycles, biometric data corresponding to the user (e.g., heartrate, temperature), etc. In some implementations, one or more machine learning networks, neural networks, deep learning networks, etc., may be implemented on one or more of the portable device, wearable device, remote computing systems, or a combination thereof, to predict potential voice data collection time durations and/or to optimize the monitoring schedule. For example, the portable device may include one or more neural networks that are trained to process the various inputs and predict periods of time during a collection cycle within which voice data is likely to collected. Based on those predictions, the monitoring schedule may be updated.

Returning to FIG. 6, based on the analysis of the various inputs and the predicted results, the monitoring schedule may be updated to specify different low power state/active state cycle frequencies or durations during different time periods and/or based on the predictions, as in 604. In block 606, the example process completes. In instances where the example process is performed on the portable device and/or remote computing systems, the optimized monitoring schedule is sent to the wearable device for implementation. If the example process 600 is performed on the wearable device, the optimized monitoring schedule is stored in a memory of the wearable device. Optionally, the wearable device may provide the optimized monitoring schedule to the portable device.

Figure 7:
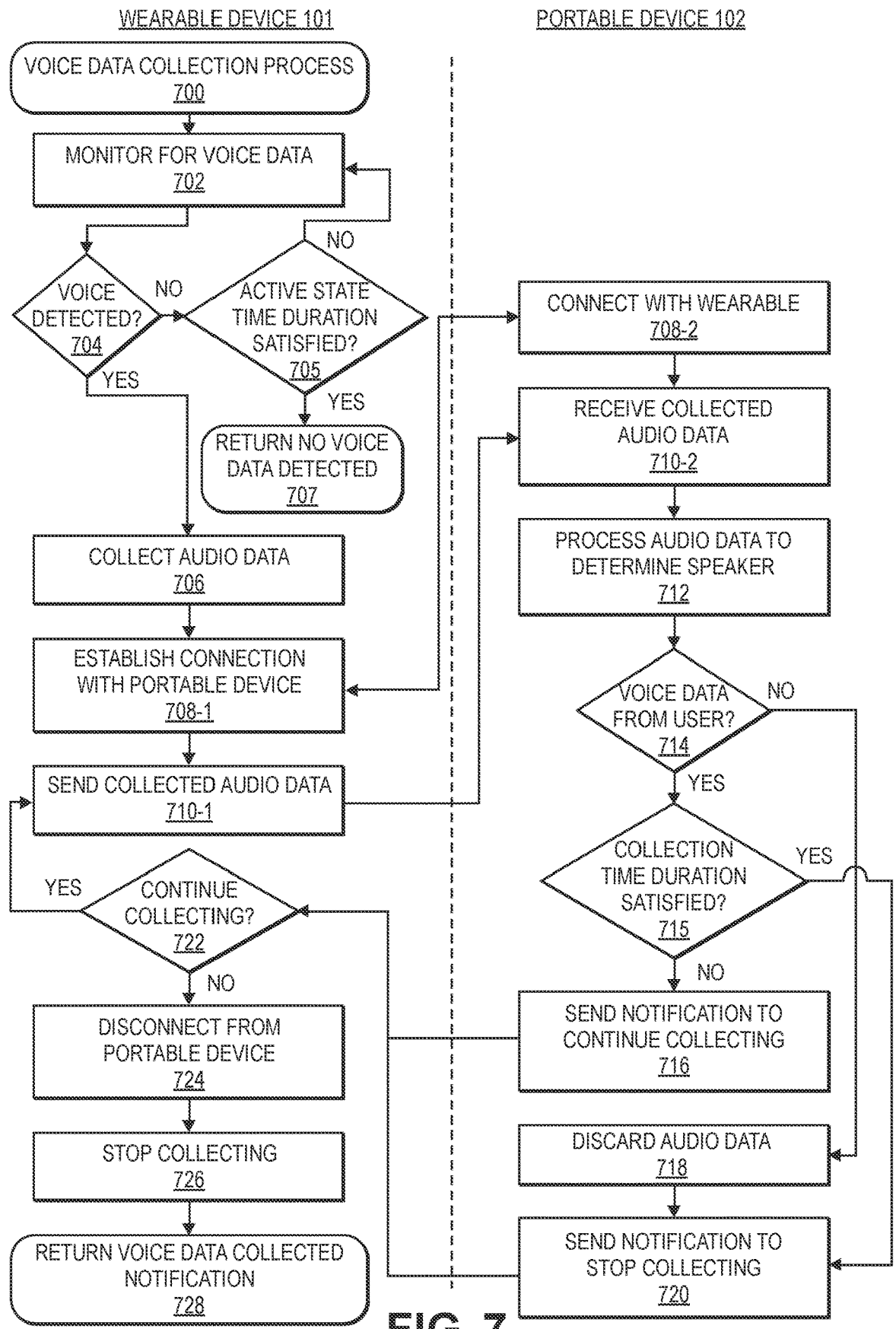
FIG. 7 is an example voice data collection process, in accordance with described implementations.

FIG. 7 is an example voice data collection process 700, in accordance with described implementations. The example process 700, and each of the other example voice data collection processes discussed herein, may be performed as part of the power conservation process 300 (FIG. 3) alone or, in some instances, in combination.

The example process 700 begins when the one or more components (e.g., microphone and VAD) of the wearable device are transitioned to the active state. While those components are in the active state, monitoring of the environment for voice data is performed, as in 702. For example, the microphone of the wearable device collects and generates audio data representative of sounds, noises, tones, voices, etc., referred to herein generally as audio, from the environment surrounding the wearable device. As the audio data is generated by the microphone, in real-time or near real-time, the VAD processes the audio data to determine if the audio data includes voice data representative of a voice of a human person, as in 702. For example and as discussed above, the VAD may be configured to process audio data, using one or more signal processing algorithms, for characteristics of signals present in the audio data (e.g., frequency, energy, zero-crossing rate, etc.) that are likely to be human speech (e.g., voice data).

As the VAD processes the audio data, a determination is made as to whether voice data is detected in the audio data, as in 704. If it is determined that voice data is not detected, a determination is made as to whether the active state time duration has been satisfied, as in 705. As discussed above, the active state time duration specifies the time duration during which the wearable device components are to be active and monitoring for voice data and may be specified in the monitoring schedule and/or provided by the monitoring schedule process (FIG. 5). If it is determined that the active state time duration has not been satisfied, the example process 700 returns to block 702 and continues. However, if it is determined that the active state time duration has been satisfied, the example process 700 completes and returns to the example power conservation process 300 a notification that no voice data was detected, as in 707.

Returning to decision block 704, if it is determined that the VAD has detected voice data in the generated audio data, a voice data collection segment for the voice data is established and collection of audio data continues, as in 706. Continuation of audio data collection, upon detection of voice data, may extend beyond the schedule active state time duration.

In addition to continuing to collect audio data, a wireless connection between the wearable device and the portable device of the user is established, as in 708-1, 708-2. Upon establishment of the wireless connection between the wearable device and the portable device associated with the user, generated audio data that includes the detected voice data is transmitted, via the wireless connection, from the wearable device to the portable device, as in 710-1, 710-2.

The portable device, as it receives the audio data from the wearable device, further processes the audio data to determine a speaker (i.e., human person) that output the voice that is represented by the voice data, as in 712. For example, the portable device may include an audio processor that is configured to process the audio data as it is received to determine if voice data included in the collected audio data corresponds to a voice of the user associated with or wearing the wearable device. For example, the audio processor may be a DSP that is tuned to process signals included in the audio data for frequencies and tones that correspond with a known vocal pattern (e.g., vocal tones and frequencies) of the voice of the user associated with the wearable device.

A determination is then made as to whether the voice data is representative of voice from the user associated with the wearable device, as in 714. If it is determined that the voice data does not correspond to the user associated with the wearable device, the data is discarded and removed from memory without further processing, as in 718. In addition, a notification is sent from the portable device to the wearable device to stop collecting the audio data, as in 720. By discarding audio data once it is determined to not correspond to the user associated with the wearable device and terminating collection of that audio data, any potential privacy issues of the non-user are protected.

Returning to decision block 714, if it is determined that the voice data does correspond to the user associated with the wearable device, a determination is made as to whether a collection time duration has been satisfied, as in 715. A collection time duration may be a maximum or defined period of time for which voice data of the user is to be collected during a voice data collection segment. For example, the collection time duration for a voice data collection segment may be two minutes, five minutes, etc. In some implementations, the collection time duration may vary depending on the amount of time remaining during a collection cycle, the amount of voice data collected for the collection cycle, user preference, etc.

If it is determined that the collection time duration has not been satisfied, a notification is sent to the wearable device to continue collecting and sending the audio data to the portable device for the voice data collection segment, as in 716. In comparison, if it is determined that the collection time duration for the voice data collection segment has been satisfied, the example process 700 proceeds to block 720 and, as discussed above, the portable device sends a notification to terminate collection of the audio data.

The wearable device, upon receiving a notification from the wearable device, determines if the notification is an instruction to continue collecting the audio data or to terminate collection of the audio data, as in 722. If the wearable device determines that it is to continue collecting the audio data, the example process 700 returns to block 710-1 and continues to collect and send the audio data to the portable device as it is collected.

However, if it is determined by the wearable device that the notification is an instruction to terminate collection, the wearable device disconnects from the portable device, as in 724, and terminates collection of the audio data, as in 726. Finally, the example process 700 returns to the example power conservation process 300 (FIG. 3) a notification that voice data was collected, as in 728.

Figure 8:
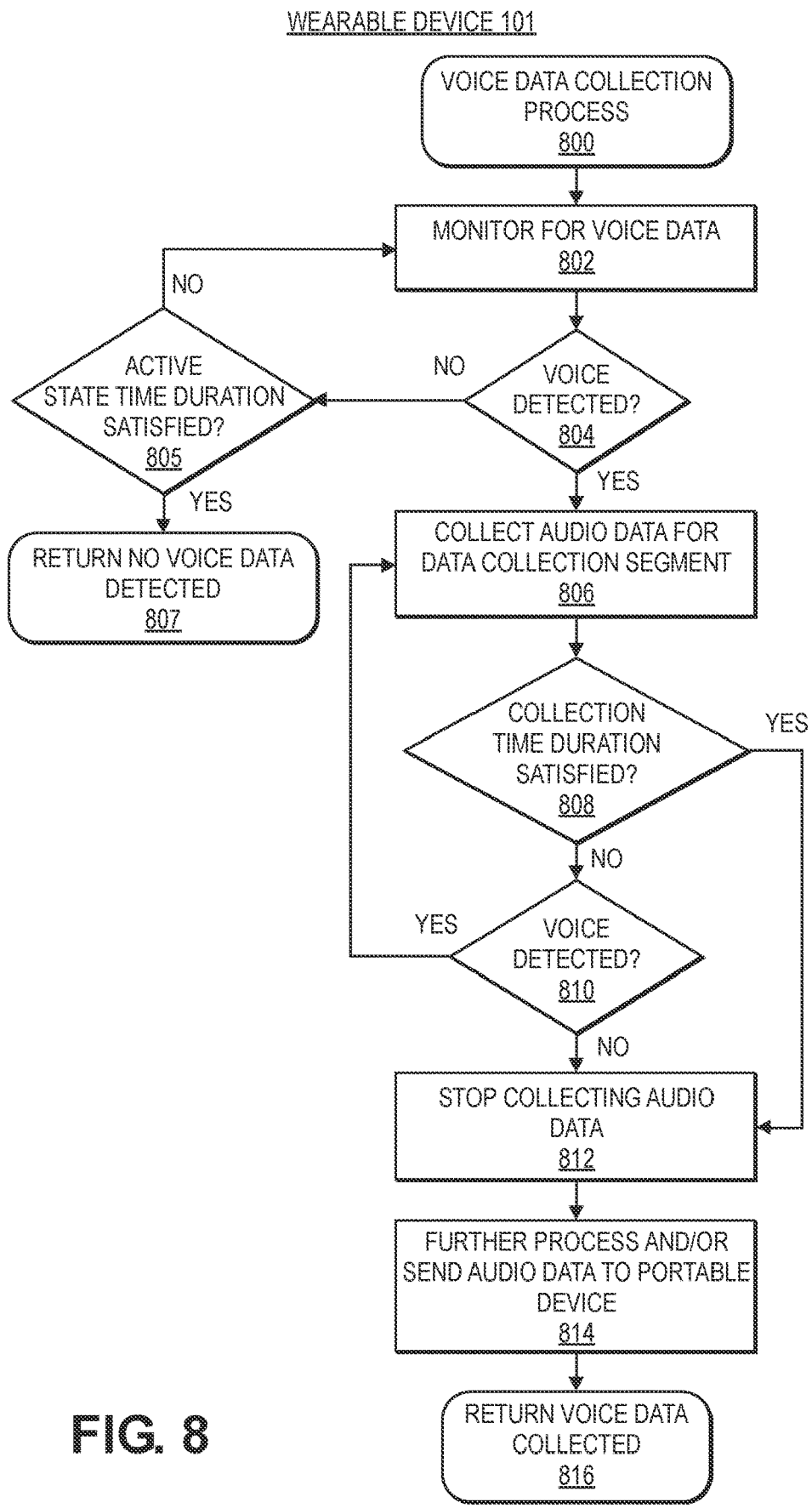
FIG. 8 is another example voice data collection process, in accordance with described implementations.

FIG. 8 is another example voice data collection process 800, in accordance with described implementations. The example process 800 may be performed entirely by the wearable device.

The example process 800 begins when the one or more components (e.g., microphone and VAD) of the wearable device are transitioned to the active state. While those components are in the active state, monitoring of the environment for voice data is performed, as in 802. For example, the microphone of the wearable device collects and generates audio data representative of audio from the environment surrounding the wearable device. As the audio data is generated by the microphone, in real-time or near real-time, the VAD processes, as discussed above, the audio data to determine if the audio data includes voice data representative of a voice of a human person.

As the VAD processes the audio data, a determination is made as to whether voice data is detected in the audio data, as in 804. If it is determined that voice data is not detected, a determination is made as to whether the active state time duration has been satisfied, as in 805. As discussed above, the active state time duration specifies the time duration during which the wearable device components are to be active and monitoring for voice data and may be specified in the monitoring schedule and/or provided by the monitoring schedule process (FIG. 5). If it is determined that the active state time duration has not been satisfied, the example process 800 returns to block 802 and continues. However, if it is determined that the active state time duration has been satisfied, the example process 800 completes and returns to the example power conservation process 300 (FIG. 3) a notification that no voice data was detected, as in 807.

Returning to decision block 804, if it is determined that the VAD has detected voice data in the generated audio data, a voice data collection segment for the voice data is established and collection of audio data continues, as in 806. Continuation of audio data collection, upon detection of voice data may extend beyond the schedule active state time duration.

As the audio data is collected, a determination is made as to whether a collection time duration has been satisfied, as in 808. As discussed above with respect to FIG. 7, a collection time duration may be a maximum or defined period of time for which voice data of the user is to be collected during a voice data collection segment. For example, the collection time duration for a voice data collection segment may be two minutes, five minutes, etc. In some implementations, the collection time duration may vary depending on the amount of time remaining during a collection cycle, the amount of voice data collected for the collection cycle, user preference, etc.

If it is determined that the collection time duration has not been satisfied, a determination is made, at the wearable device, as to whether the collected audio data continues to include voice data, as in 810. Determination as to whether the collected audio data continues to include voice data may be performed in a manner similar to that discussed above for initial detection of voice data in the audio data. For example, the VAD of the wearable device may continue to process the audio data as it is received to determine if the audio data includes voice data.

If it is determined that the audio data continues to include voice data, the example process 800 returns to block 806 and continues to collect audio data for the voice data collection segment. However, if it is determined at decision block 808 that the collection time duration has been satisfied or if it is determined at decision block 810 that voice data is not detected in the collected audio data, the example process terminates collection of audio data for that voice data collection segment, as in 812. In addition, the audio data collected for that voice data collection segment that was determined to include voice data associated with the user may be stored in the memory of the wearable device.

The stored audio data for the voice data collection segment may then be further processed at the wearable device and/or sent via a wireless connection to the portable device, as in 814. For example, if further processing is to be performed at the wearable device, the voice data determined to be representative of the user may be processed to determine one or more aspects of the voice data, such as intent, sentiment, action, etc. Upon completion of processing, the audio data may be discarded and removed from memory, with on the determined aspects remaining. As another example, the wearable device may send an indication to the portable device that audio data corresponding to a voice data collection segment of the user associated with the wearable device is available for retrieval by the portable device, or that the determined aspects remaining. In such an example, the portable device may, in response to the notification, connect with the wearable device and retrieve the audio data for the voice data collection segment generated by the example process 800. Once retrieved by the portable device, the audio data for the voice data collection segment may be discarded from memory of the wearable device.

Finally, the example process 800 returns to the example power conservation process 300 (FIG. 3) a notification that voice data was collected, as in 816.

FIG. 9 is another example voice data collection process 900, in accordance with described implementations. Like the example process 800 (FIG. 8), the example voice data collection process 900 may be performed entirely by the wearable device.

The example process 900 begins when the one or more components (e.g., microphone and VAD) of the wearable device are transitioned to the active state. While those components are in the active state, monitoring of the environment for voice data is performed, as in 902. For example, the microphone of the wearable device collects and generates audio data representative of audio from the environment surrounding the wearable device. As the audio data is generated by the microphone, in real-time or near real-time, the VAD processes, as discussed above, the audio data to determine if the audio data includes voice data representative of a voice of a human person.

As the VAD processes the audio data, a determination is made as to whether voice data is detected in the audio data, as in 904. If it is determined that voice data is not detected, a determination is made as to whether the active state time duration has been satisfied, as in 905. As discussed above, the active state time duration specifies the time duration during which the wearable device components are to be active and monitoring for voice data and may be specified in the monitoring schedule and/or provided by the monitoring schedule process (FIG. 5). If it is determined that the active state time duration has not been satisfied, the example process 900 returns to block 902 and continues. However, if it is determined that the active state time duration has been satisfied, the example process 900 completes and returns to the example power conservation process 300 (FIG. 3) a notification that no voice data was detected, as in 907.

Returning to decision block 904, if it is determined that the VAD has detected voice data in the generated audio data, a voice data collection segment for the voice data is established and collection of audio data continues, as in 906. Continuation of audio data collection, upon detection of voice data may extend beyond the schedule active state time duration.

As the audio data is collected, a determination is made as to whether the additionally collected audio data continues to include voice data, as in 907. Determination as to whether the audio data continues to include voice data may be performed in a manner similar to that discussed above with respect to initial collection of the audio data. For example, the VAD of the wearable device may continue to process the audio data as it is generated to determine if the audio data continues to include voice data.

If it is determined that the audio data does continue to include voice data, the audio data may be further processed, in real-time or near real time, to determine the speaker (i.e., human person) that output the voice that is represented by the voice data included in the audio data, as in 908. For example, the wearable device may include an audio processor that is configured to process the audio data as it is generated to determine if a voice included in the collected audio data corresponds to a voice of the user associated with or wearing the wearable device. For example, the audio processor may be a DSP or LSTM network that is tuned to process signals included in the audio data for frequencies and tones that correspond with known vocal patterns (e.g., vocal tones and frequencies) of the voice of the user associated with the wearable device. In such an example, upon determination that the audio data includes voice data, the audio processor may be transitioned from the low power state to the active data so that the audio process can process the audio data.

A determination is then made as to whether the voice data is representative of voice from the user associated with the wearable device, as in 910. If it is determined that the voice data does not correspond to the user associated with the wearable device, the data is discarded and removed from memory without further processing, as in 918.

If it is determined that the voice data does correspond to the user associated with the wearable device, a determination is made as to whether a collection time duration has been satisfied, as in 912. A collection time duration may be a maximum or defined period of time for which voice data of the user is to be collected during a voice data collection segment. For example, the collection time duration for a voice data collection segment may be two minutes, five minutes, etc. In some implementations, the collection time duration may vary depending on the amount of time remaining during a collection cycle, the amount of voice data collected for the collection cycle, user preference, etc.

If it is determined that the collection time duration has not been satisfied, the example process 900 returns to block 906 and continues. In comparison, if it is determined that the collection time duration for the voice data collection segment has been satisfied, collection of the audio data is terminated for the audio data collection segment, as in 916. In addition to terminating collection of audio data upon satisfaction of the collection time duration, if it is determined at decision block 907 that the audio data no longer includes voice data, collection of the audio data is terminated, as in 916.

The audio data collected for the audio data collection segment that was determined to include voice data associated with the user may be stored in a memory of the wearable device. The stored audio data for the voice data collection segment may then be further processed at the wearable device and/or sent via a wireless connection to the portable device, as in 920. For example, if further processing is to be performed at the wearable device, the voice data determined to be representative of the user may be processed to determine one or more aspects of the voice data, such as intent, sentiment, action, etc. Upon completion of processing, the audio data may be discarded and removed from memory, with on the determined aspects remaining. As another example, the wearable device may send an indication to the portable device that audio data corresponding to a voice data collection segment of the user associated with the wearable device is available for retrieval by the portable device, or that determined aspects are available. In such an example, the portable device may, in response to the notification, connect with the wearable device and receive the audio data for the voice data collection segment generated by the example process 900. Once retrieved by the portable device, the audio data for the voice data collection segment may be discarded from memory of the wearable device.

Finally, the example process 900 returns to the example power conservation process 300 (FIG. 3) a notification that voice data was collected, as in 922.

FIG. 10 is an example voice data collection completion process 1000, in accordance with described implementations. The example process may be performed on the wearable device 101 associated with the user 100, performed on the portable device 102 of the user 100, and/or performed on one or more remote computing devices. In implementations in which the example process 1000 is performed on remote computing devices, the example process does not utilize any audio data and/or voice data.

The example process 1000 begins by determining a total amount of user voice data collected during a collection cycle, as in 1002. As discussed above, in some implementations, a minimum and/or maximum amount of voice data for a collection cycle may be specified. For example, a minimum amount of voice data collected during a collection cycle may be ten minutes and a maximum amount of voice data collected during a collection cycle may be one-hundred eighty minutes. In other implementations the minimum and/or maximum may be higher or lower. Likewise, in some implementations, the minimum and/or maximum may be determined based on, for example, voice data collected for the user during prior collection cycles, the amount of power remaining for the wearable device, user specified preferences, etc.

A determination is then made as to whether the voice data collected satisfies the maximum collection amount specified for the collection cycle, as in 1004. If it is determined that the total voice data collected for the collection cycle satisfies the maximum collection amount, the example process completes and sends a notification to the example power conservation process 300 (FIG. 3) that that collection cycle has is complete, as in 1008.

If it is determined at decision block 1004 that the maximum collection amount has not been satisfied, a determination is made as to whether the monitoring schedule is to be adjusted, as in 906. For example, if the total voice data collected for the collection cycle is below an expected amount at a current point during the collection cycle, it may be determined that the monitoring frequency indicated in the monitoring schedule is be increased to increase the likelihood that at least the minimum collection amount is satisfied. As another example, if the total voice data collected, while not yet satisfying the maximum collection amount, is above an expected total collection amount at a current point during the collection cycle, the monitoring frequency indicated in the monitoring schedule may be decreased to both conserve power and to better distribute the collection of voice data over the entire collection cycle.

If it is determined that the monitoring schedule is to be adjusted, the example monitoring schedule optimization process 600, discussed above with respect to FIG. 6 may be performed to adjust the monitoring schedule, as in 1008. If it is determined that the monitoring schedule does not need to be adjusted, the example process 1000 completes and sends a notification to the example power conservation process 300 (FIG. 3) to continue the collection cycle, as in 1010.

Figure 11:
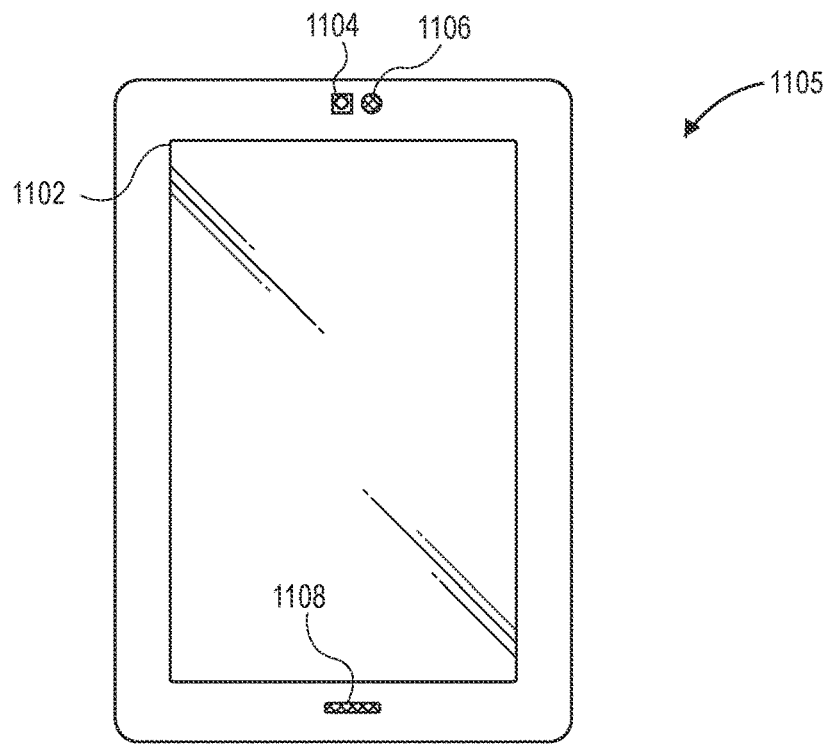
FIG. 11 illustrates an example portable device that can be used in accordance with various implementations.

FIG. 11 illustrates an example portable device 1105 that can be used in accordance with various implementations described herein. In this example, the portable device 1105 includes a display 1102 and optionally at least one input component 1104, such as a camera, on a same side of the device as the display 1102. The portable device 1105 may also include an audio transducer, such as a speaker 1106, and optionally a microphone 1108. Generally, the portable device 1105 may have any form of input/output components that allow a user to interact with the portable device 1105. For example, the various input components for enabling user interaction with the device may include a touch-based display 1102 (e.g., resistive, capacitive, Interpolating Force-Sensitive Resistance (IFSR)), camera (for gesture tracking, etc.), microphone, global positioning system (GPS), compass or any combination thereof. Various other input components and combinations of input components can be used as well within the scope of the various implementations as should be apparent in light of the teachings and suggestions contained herein.

Figure 12:
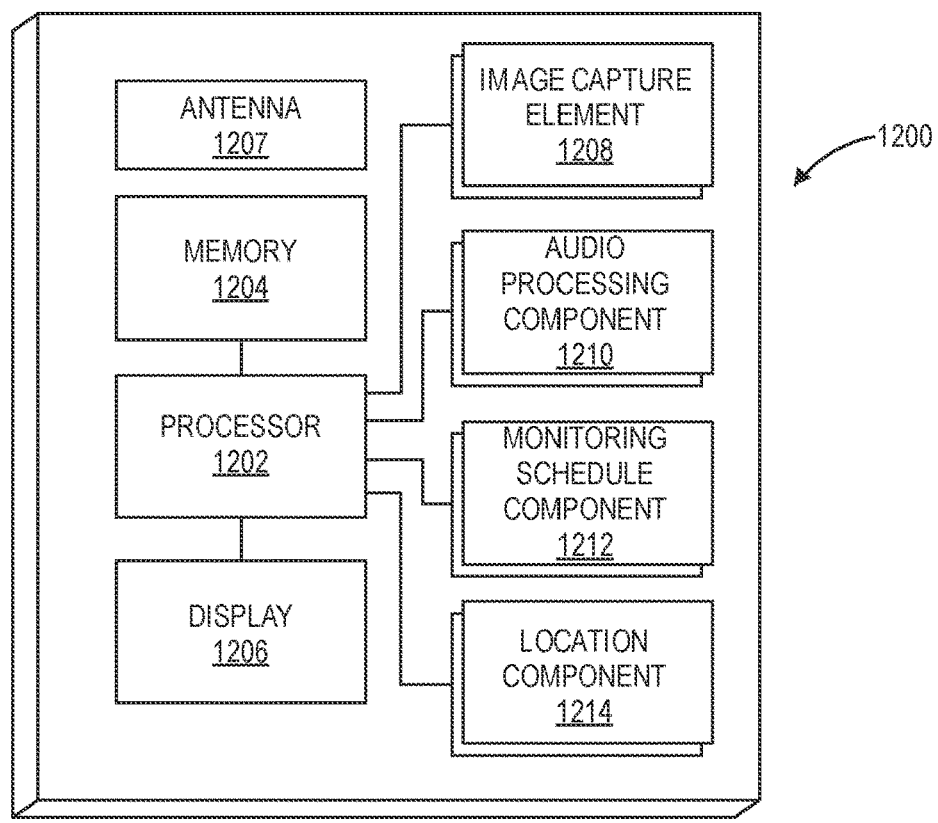
FIG. 12 illustrates an example configuration of components of a portable device, such as that illustrated in FIG. 11.

In order to provide the various functionality described herein, FIG. 12 illustrates an example set of basic components 1200 of a portable device 1105, such as the portable device 1105 described with respect to FIG. 11 and discussed herein. In this example, the device includes at least one central processor 1202 for executing instructions that can be stored in at least one memory device or element 1204. As would be apparent to one of ordinary skill in the art, the device can include many types of memory, data storage or computer-readable storage media, such as a first data storage for program instruction for execution by the processor 1202. Removable storage memory can be available for sharing information with other devices, etc. The device typically will include some type of display 1206, such as a touch-based display, organic light emitting diode (OLED) or liquid crystal display (LCD).

As discussed, the device in many implementations will include at least one image capture element 1208, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one audio processing component 1210 operable to process audio data received for example, from a wearable device, such as the wearable device 101 discussed with respect to FIG. 1. The device may also include a monitoring schedule component 1212 that stores and/or develops monitoring schedules for the wearable device 101, as discussed herein.

The device also can include at least one location component 1214, such as GPS, NFC location tracking or Wi-Fi location monitoring. Location information obtained by the location component 1214 may be used with the various implementations discussed herein to identify the location of the portable device, the location of the wearable device, and/or the location of the user.

The example portable device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed apparatus, method, and system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    executing, on a device that includes a battery and a plurality of battery powered components that are powered by the battery, a monitoring schedule that includes a low power state time duration and an active state time duration, wherein the plurality of battery powered components include a voice activity detector;
    during a first low power state time duration of the monitoring schedule:
        maintaining the plurality of battery powered components in a low power state to preserve a battery charge of the battery;
    upon completion of the first low power state time duration:

transitioning the voice activity detector from the low power state to an active state;
generating, at the device and during a first active state time duration of the monitoring schedule, a first audio data; and
determining, at the device and with the voice activity detector during the first active state time duration, that a voice was not detected in the first audio data;
in response to determining that the voice was not detected in the first audio data:
  transitioning the voice activity detector to the low power state;
  increasing the low power state time duration of the monitoring schedule from the first low power state time duration to a second low power state time duration that is longer than the first low power state time duration; and
  maintaining the plurality of battery powered components in the low power state for the second low power state time duration;
upon completion of the second low power state time duration:
  transitioning the voice activity detector from the low power state to the active state;
  generating, at the device and during a second active state time duration, second audio data; and
  determining, at the device and with the voice activity detector during the second active state time duration, that the voice was detected in a second audio data;
  in response to determining that the voice was detected:
  maintaining the voice activity detector in the active state; and
  continuing to collect the second audio data.

2. The computer-implemented method of claim 1, further comprising:
determining, at the device and as the second audio data is collected, whether the voice continues to be included in the second audio data;
in response to determining that the voice continues to be included in the second audio data, continuing to collect, at the device, the second audio data; and
in response to determining that the voice is no longer included in the second audio data:
  terminating the collection of the second audio data; and
  transitioning the voice activity detector to the low power state to preserve the battery charge of the battery.

3. The computer-implemented method of claim 2, further comprising:
in response to determining that the voice is no longer included in the second audio data:
  resetting the low power state time duration from the second low power state time duration to the first low power state time duration; and
  maintaining the plurality of battery power components in the low power state for the first low power state time duration.

4. The computer-implemented method of claim 1, further comprising:
transitioning an audio processor of the plurality of battery powered components from the low power state to the active state;
processing, with the audio processor, the second audio data to determine if the voice included in the second audio data corresponds to a vocal pattern of a user associated with the device; and
in response to determining that the voice included in the second audio data corresponds to the vocal pattern of the user, transmitting at least a portion of the second audio data from the device.

5. The computer-implemented method of claim 4, wherein:
the device is a wearable device worn by the user; and
transmitting the at least a portion of the second audio data from the device includes transmitting at least a portion of the second audio data from the wearable device to a portable device associated with the user.

6. An apparatus, comprising:
a power source;
one or more processors powered by the power source;
a voice activity detector powered by the power source;
a wireless transmitter powered by the power source; and
a memory storing program instructions that, when executed by the one or more processors, cause the one or more processor to at least:
  maintain at least the wireless transmitter and the voice activity detector in a low power state to conserve a power supply of the power source during a first low power state time duration of a monitoring schedule;
upon completion of the first low power state time duration:
  transition the voice activity detector from the low power state to an active state for a first active state time duration of the monitoring schedule;
  generate, at the apparatus and during the first active state time duration of the monitoring schedule, a first audio data; and
  determine, at the apparatus and with the voice activity detector during the first active state time duration, that a voice was not detected in the first audio data;
in response to determining that the voice was not detected in the first audio data:
  transition the voice activity detector to the low power state;
  increase a low power state time duration of the monitoring schedule from the first low power state time duration to a second low power state time duration that is longer than the first low power state time duration; and
  maintain at least the wireless transmitter and the voice activity detector in the low power state for the second low power state time duration;
upon completion of the second low power state time duration:
  transition the voice activity detector from the low power state to the active state;
  generate, at the apparatus and during a second active state time duration, second audio data; and
  determine, at the apparatus and with the voice activity detector during the second active state time duration, that the voice was not detected in the second audio data;
in response to determining that the voice was not detected in the second audio data:
  transition the voice activity detector to the low power state;
  increase the low power state time duration of the monitoring schedule from the second low power state time duration to a third low power state time duration that is longer than the second low power state time duration; and maintain at least the wireless transmitter and the voice activity detector in the low power state for the third low power state time duration;
upon completion of the third low power state time duration:
transition the voice activity detector from the low power state to the active state;
generate, at the apparatus and during a third active state time duration, third audio data; and
determine, at the apparatus and with the voice activity detector during the third active state time duration, that the voice was detected in the third audio data;
in response to determination that the voice was detected in the third audio data:
maintain the voice activity detector in the active state; and
continue to collect the third audio data.

7. The apparatus of claim 6, wherein the program instructions that, when executed by the one or more processors, further cause the one or more processors to at least:
process the third audio data to determine that the voice detected in the third audio data corresponds to a user associated with the apparatus;
further process the voice to determine at least one aspect corresponding to the voice; and
upon completion of the processing of the voice, discard the third audio data.

8. The apparatus of claim 6, wherein the program instructions that, when executed by the one or more processors, further cause the one or more processors to at least:
process the third audio data to determine that the voice does not correspond to a user associated with the apparatus; and
discard the third audio data without further processing of the third audio data.

9. The apparatus of claim 6, wherein the program instructions that, when executed by the one or more processors, further cause the one or more processors to at least:
determine, based at least in part on the processing of the third audio data, that the third audio data no longer includes the voice;
in response to determination that the third audio data no longer includes the voice:
terminate the collection of the third audio data;
reset the low power state time duration to the first low power state time duration; and
transition the voice activity detector to the low power state for the first low power state time duration.

10. The apparatus of claim 6, wherein the apparatus is at least one of a wristband, a necklace, a headphone, a ring, a watch, an earring, a headband, a glasses, a clothing, or an on-skin apparatus.

11. The apparatus of claim 6, wherein the program instructions that, when executed by the one or more processors, further cause the one or more processors to at least:
transmit at least a portion of the third audio data from the apparatus.

12. The apparatus of claim 6, wherein the program instructions that, when executed by the one or more processors, further cause the one or more processors to at least:
process, with the one or more processors, the third audio data to determine that the voice included in the third audio data corresponds to a vocal pattern of a user associated with the apparatus; and
in response to determination that the voice included in the third audio data corresponds to the vocal pattern of the user, transmit the third audio data from the apparatus.

13. The apparatus of claim 6, wherein the program instructions that, when executed by the one or more processors, further cause the one or more processors to at least:
process, with the one or more processors, the third audio data to determine that the voice included in the third audio data does not correspond to a vocal pattern of a user associated with the apparatus; and
in response to determination that the voice included in the third audio data does not correspond to the vocal pattern of the user:
terminate the collection of the third audio data;
discard the third audio data;
increase the low power state time duration to a fourth low power state time duration that is longer than the third low power state time duration; and
transition the voice activity detector to the low power state for the fourth low power state time duration.

14. The apparatus of claim 6, wherein the first low power state time duration is longer than the first active state time duration.

15. A method, comprising:
during a first low power state time duration of a monitoring schedule:
maintaining a plurality of battery powered components of a device in a low power state to preserve a battery charge of a battery of the device that is used to power the plurality of battery powered components;
upon completion of the first low power state time duration:
transitioning a voice activity detector from the low power state to an active state, wherein the voice activity detector is included in the plurality of battery powered components;
generating, during a first active state time duration of the monitoring schedule, a first audio data; and
determining, at the device and with the voice activity detector during the first active state time duration, that a voice was not detected in the first audio data;
in response to determining that the voice was not detected in the first audio data:
transitioning the voice activity detector to the low power state;
increasing a low power state time duration from the first low power state time duration to a second low power state time duration that is longer than the first low power state time duration; and
maintaining the plurality of battery powered components in the low power state for the second low power state time duration;
upon completion of the second low power state time duration:
transitioning the voice activity detector from the low power state to the active state;
generating, at the device and during a second active state time duration, second audio data; and
determining, at the device and with the voice activity detector during the second active state time duration, that the voice was not detected in a second audio data;
in response to determining that the voice was not detected:
transitioning the voice activity detector to the low power state;
increasing the low power state time duration from the second low power state time duration to a third low power state time duration that is longer than the second low power state time duration; and maintaining the plurality of battery powered components in the low power state for the third low power state time duration.

16. The method of claim 15, further comprising:
determining, at the device and with the voice activity detector during a third active state time duration that is subsequent to the third low power state time duration, that the voice was detected in a third audio data collected at the device during the third active state time duration;
in response to determining that the voice was detected:
 maintaining the voice activity detector in the active state; and
 continuing to collect the third audio data.

17. The method of claim 16, further comprising:
processing the third audio data;
determining that the voice is no longer detected in the third audio data; and
in response to determining that the voice is no longer detected in the third audio data:
 terminating collection of the third audio data;
 resetting the low power state time duration to the first low power state time duration; and
 transitioning the plurality of battery powered components to the low power state for the first low power state time duration.

18. The method of claim 16, further comprising:
processing the voice to determine that the voice corresponds to a user associated with the device; and
in response to determining that the voice corresponds to the user, transmitting at least a portion of the third audio data from the device.

19. The method of claim 16, further comprising:
processing the voice to determine that the voice does not correspond to a user associated with the device; and
in response to determining that the voice does not correspond to the user:
 terminating collection of the third audio data;
 increasing the low power state time duration to a fourth low power state time duration that is greater than the third low power state time duration; and
 discarding the third audio data.

20. The method of claim 16, wherein at least one of the active state time duration, the first low power state time duration, the second low power state time duration, or the third low power state time duration is based at least in part on one or more of a time of day, a user historical behavior, a calendar information of the user, a user provided preference, an amount of time remaining in a collection cycle, or an amount of voice data collected during the collection cycle.

* * * * *